(12) United States Patent
Haghighi et al.

(10) Patent No.: US 9,575,161 B1
(45) Date of Patent: Feb. 21, 2017

(54) SYSTEM FOR GENERATING VIRTUAL RADAR SIGNATURES

(71) Applicant: UniqueSec AB, Hovås (SE)

(72) Inventors: Kasra Haghighi, Hovås (SE); Fahimeh Rafieinia, Askim (SE)

(73) Assignee: UniqueSec AB, Hovås (SE)

( * ) Notice: Subject to any disclaimer, the term of this patent is extended or adjusted under 35 U.S.C. 154(b) by 0 days.

(21) Appl. No.: 14/954,130

(22) Filed: Nov. 30, 2015

(30) Foreign Application Priority Data

Oct. 22, 2015 (SE) ........................ 1551370

(51) Int. Cl.
  *G01S 7/40* (2006.01)
(52) U.S. Cl.
  CPC ............ *G01S 7/4052* (2013.01); *G01S 7/4056* (2013.01); *G01S 2007/406* (2013.01)
(58) Field of Classification Search
  CPC G01S 7/4052; G01S 7/4056; G01S 2007/406; G01S 13/931
  USPC .................. 342/168–172, 70–72, 90, 64
  See application file for complete search history.

(56) References Cited

U.S. PATENT DOCUMENTS

| | | | |
|---|---|---|---|
| 6,114,985 A * | 9/2000 | Russell ................. | G01S 7/4052 342/165 |
| 6,392,586 B1 * | 5/2002 | Thordarson ........... | G01S 7/4004 342/169 |
| 2009/0121915 A1 | 5/2009 | Randler et al. | |
| 2012/0127016 A1 | 5/2012 | Watanabe et al. | |

FOREIGN PATENT DOCUMENTS

| | | | |
|---|---|---|---|
| DE | 102010031910 A1 | 1/2012 | |
| DE | 102013018752 A1 | 5/2015 | |
| EP | 0568427 A1 | 11/1993 | |
| EP | 2988369 A1 * | 2/2016 | ............... H01Q 1/32 |
| FR | 3013867 A1 | 5/2015 | |
| KR | 20130099304 A * | 9/2013 | |

OTHER PUBLICATIONS

Henna Perälä et al, On Efficient Characterization of Radar Targets with Scatterer Sets for Target Recognition Using Commercial Ray Tracing Software, pp. 0260-0264, 2014, IEEE.
Andrew N. O'Donnell, Compressed Sensing for Radar Signature Analysis, pp. 2631-2639, Oct. 2013, IEEE Transactions on Aerospace and Electronic Systems, vol. 49, No. 4.
Final Notice (2 Months) for corresponding SE Patent Application No. 1551370-8 mailed May 16, 2015.

* cited by examiner

*Primary Examiner* — John B Sotomayor
(74) *Attorney, Agent, or Firm* — Renner, Otto, Boisselle & Sklar, LLP

(57) ABSTRACT

The invention relates to a method and system for testing and evaluating a response of an automotive radar system for a specific automotive safety scenario, wherein the method and system generates a simulated reflected radar signature corresponding to at least one virtual target in a specific virtual scenario. The simulated radar signature is generated from one or more of:
  a pre-recorded real reflected radar signature from at least one real target in a specific real scenario,
  an analytical representation of a radar target signature from at least one virtual target in a specific virtual scenario.

18 Claims, 6 Drawing Sheets

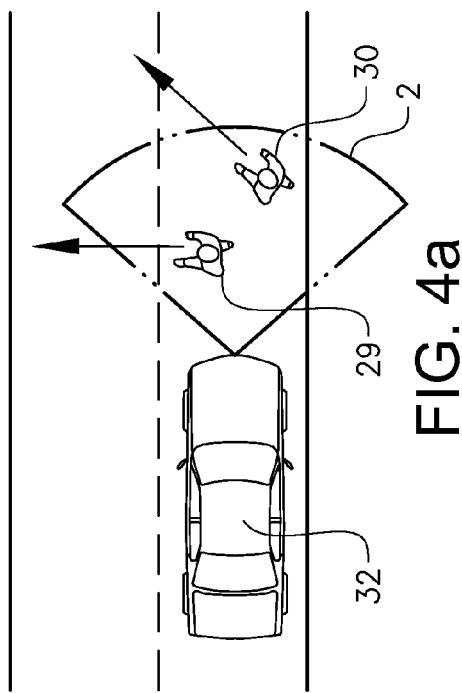
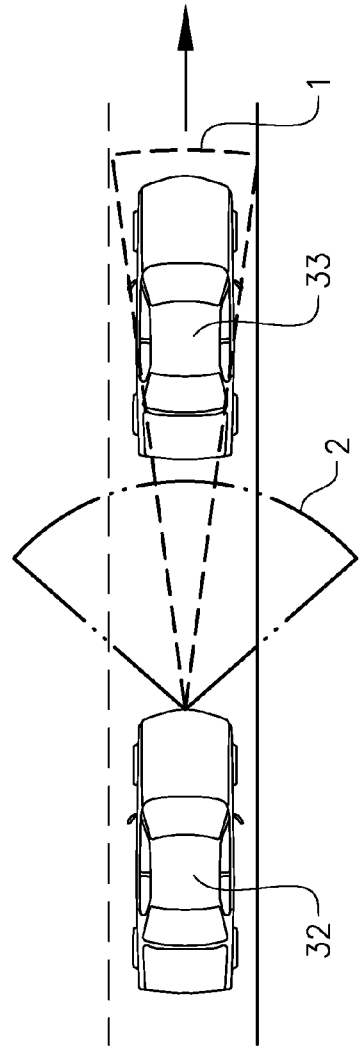

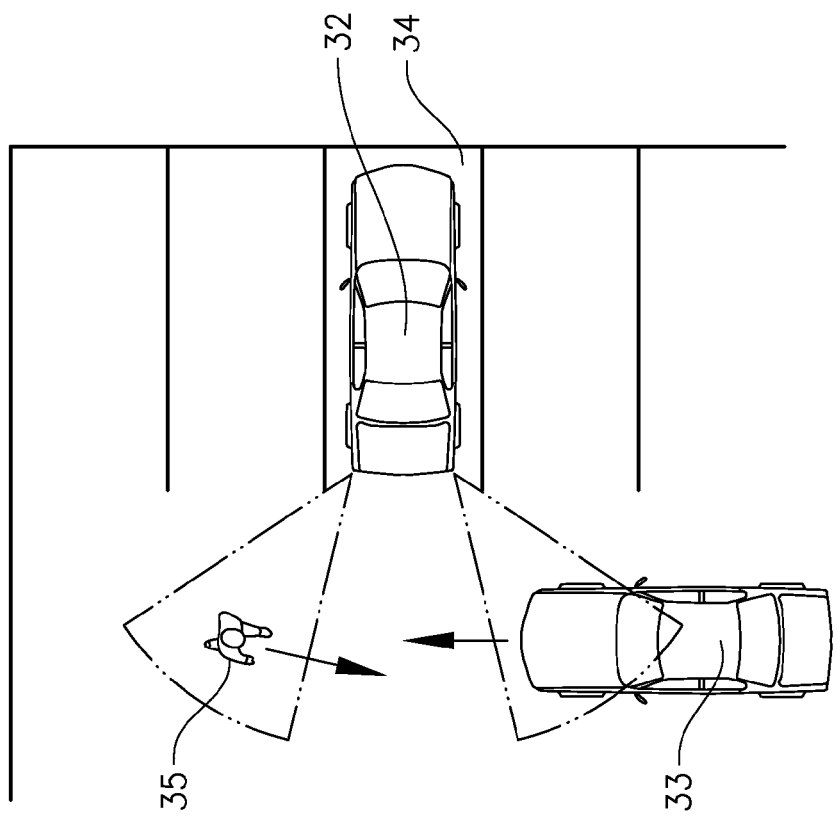

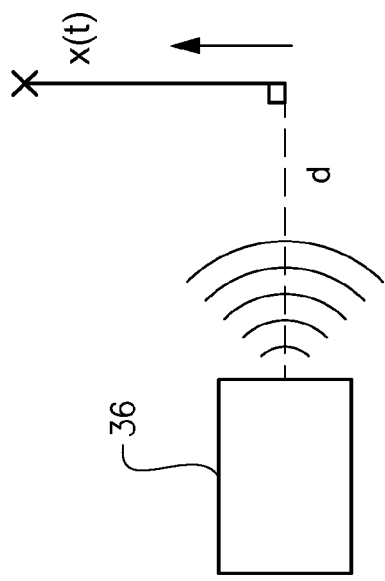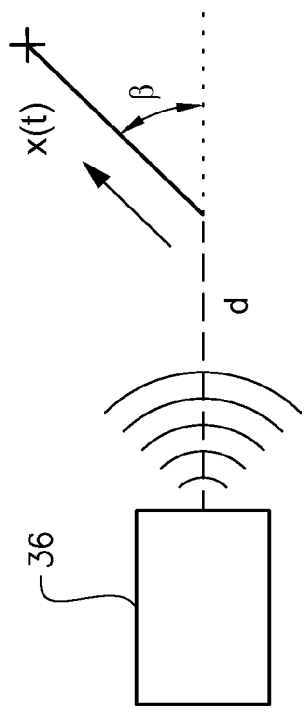
FIG. 5a
FIG. 5b

SYSTEM FOR GENERATING VIRTUAL RADAR SIGNATURES

TECHNICAL FIELD

This invention relates to radar systems and to a method and system for generation of a virtual environment including virtual targets that is meant to be used for evaluation of automotive safety radar systems.

BACKGROUND ART

In order to evaluate the functionality of radar systems in many applications, it is required that they are tested under reproducible, controlled and known conditions similar to real environment. Simulation of radar targets makes it possible to test actual radar systems in an enclosed space, e.g. an electromagnetic chamber or in a lab environment.

Verification of the performance of such radar-based safety system is highly demanded.

SUMMARY OF THE INVENTION

An objective of this invention is to provide a method and a system for testing and evaluating a response of an automotive radar system for a specific automotive safety scenario wherein the above-mentioned problems are avoided. In particular, it is an objective of the invention to improve upon the known methods for testing and evaluating a response of an automotive radar system for a specific automotive safety scenario. This objective is achieved by the method of claim 1 and the system of claim 10.

Considering the many possible scenarios that are likely to occur in real world for each of the above-mentioned radars, in order to certify performance of the safety system more confidently, recreation of scenarios and targets is crucial.

The present invention relates to a hardware in the loop setup that can emulate various scenarios and targets. Target generation is carried out with two approaches: "analytic" and "record-and-play", which together make it possible to reproduce a large number of radar targets in a wide variety of scenarios.

Hardware in the loop is a setup where a device under test (DUT) input and output are controlled using one system. The system generates the intended reflected radar signal for the DUT, which in this invention is a radar based automotive active safety system. The response or reaction of the DUT is analysed by the test system. Based on the reflected radar signature and how the radar system reacted and what was perceived by the DUT, the performance of the system is evaluated and is reported back to the GUI. The performance of the DUT is not only from the radar in the system but from the whole decision making system in the car including ancillary electronics.

The invention relates to a method for testing and evaluating a response of an automotive radar system for a specific automotive safety scenario, wherein the method comprises:
  arranging at least one automotive radar in a hardware in the loop setup,
  generating a simulated reflected radar signature corresponding to at least one target in a specific scenario,
  receiving the simulated signature by the at least one automotive radar,
  evaluating a response of the automotive radar system by comparing an output from the automotive radar system with an expected output based on the simulated target signature,
  displaying one or more of: error in velocity, error in distance, misdetection of the at least one target and false alarms,
wherein the generated simulated reflected radar signature corresponding to at least one target in a specific scenario is generated from one or more of:
  a pre-recorded real reflected radar signature from at least one target in a specific scenario,
  an analytical representation of a radar target signature from at least one target in a specific scenario.

In general, target simulation means generation of electromagnetic reflection signals similar to signals that would have been returned from actual targets. One method to generate such signals is to apply information that is expected to be seen in real target returns to a signature. This information include Doppler shift, radar cross section (RCS), delay, multi path effects, antenna beam pattern, position of target, information regarding the environment, clutter and so on. In addition, in order to generate a sufficient variety of targets, several scenarios and different possibilities need to be considered. In the present invention, in one method real return signals are recorded to be deployed in generation of virtual targets. Using this method, the complexity of adding parameters and complicated calculations will be reduced remarkably and virtually any target or clutter could be reproduced with most authenticity.

This invention means to recreate a wide variety of radar targets according to different scenarios that a radar in automotive safety application might encounter. The objective is to have a hardware in the loop (HIL) setup in which different possible radar targets are generated virtually in order to evaluate and certify functionality of different radars in a vehicle. This is carried out in the present invention with two approaches. In the first one, virtual target is simulated based on an analytic function, in which parameters and assumptions of the desired target are taken into account. The second approach is according to recording real targets in any scenario and playing them for the radar under test. This provides a high degree of flexibility in generation of radar targets and the result would be authentic.

The specific scenario may comprise one or more of:
  at least one target, including pedestrians, cyclists, cars, trucks, animals, motorcycles, construction vehicles, road signs, road obstacles,
  clutter,
  environmental scenario conditions,
  traffic scenario conditions.

With environmental scenario conditions is meant weather, visibility, temperature, humidity and other conditions that may affect the signal to noise ratio (SNR) in radar system, this may include clutter. With traffic scenario conditions is meant the traffic situation in which the at least one target is located. Examples of traffic situations can be a target travelling along a straight line, a target performing a turn, a target in a roundabout, a target performing a manoeuvre or a target parking. Traffic scenario conditions can also be topography affecting the radar signature of the target in the specific automotive safety scenario.

The pre-recorded real reflected radar signature from a target in a specific scenario may be generated by a processing unit by accessing a pre-recorded real reflected radar signature database.

The pre-recorded real reflected radar signature database may be created by recording real reflected radar signal with a radar recorder system, wherein the radar recorder system records target data, clutter data and environmental scenario conditions and traffic scenario conditions and stores each data in a respective target data database, clutter data database and scenario conditions database.

The analytical representation may be based on target parameters of the target in a specific scenario and of scenario parameters of the specific scenario.

Target parameters of the analytical representation may be one or more of:
- type of target including pedestrians, cyclists, cars, trucks, animals, motorcycles, construction vehicles, road signs, road obstacles,
- target velocity, distance, angle or trajectory of movement,
- target radar cross section (RCS), including the case of partial coverage of target by radar beam, and change in RCS over time.

Scenario parameters of the analytical representation may be are one or more of:
- environmental scenario conditions,
- traffic scenario conditions.

The simulated reflected radar signature may be randomly selected based on specification of target parameters, list of scenarios and scenario conditions.

The simulated reflected radar signature may be a full continuous wave.

The invention further relates to a system for testing and evaluating a response of an automotive radar system for a specific automotive safety scenario, wherein the system comprises:
- at least one automotive radar in a hardware in the loop setup,
- an electronic computer unit connected to the at least one automotive radar,
- an evaluation module (for evaluating the performance of radar-based safety system),
- a graphical user interface,
- a radar front end arranged to generate a simulated reflected radar signature corresponding to at least one target in a specific scenario, wherein the generated simulated reflected radar signature corresponding to at least one target in a specific scenario is generated from one or more of:
- a pre-recorded real reflected radar signature from at least one target in a specific scenario,
- an analytical representation of a radar target signature from at least one target in a specific scenario.

The specific scenario may comprise one or more of:
- at least one target,
- clutter,
- environmental scenario conditions,
- traffic scenario conditions.

In the system, the pre-recorded real reflected radar signature from a target in a specific scenario may be generated by a processing unit by accessing a pre-recorded real reflected radar signature database.

In the system, the pre-recorded real reflected radar signature database may be created by recording real reflected radar signal with a radar recorder system, wherein the radar recorder system records target data, clutter data and environmental scenario conditions and traffic scenario conditions and stores each data in a respective target data database, clutter data database and scenario conditions database.

In the system, the analytical representation may be based on target parameters of the target in a specific scenario and of scenario parameters of the specific scenario.

In the system, target parameters of the analytical representation may be one or more of:
- type of target including pedestrians, cyclists, cars, trucks, animals, motorcycles, construction vehicles, road signs, road obstacles,
- target velocity, distance, angle or trajectory of movement,
- target radar cross section (RCS), including the case of partial coverage of target by radar beam, and change in RCS over time.

In the system, scenario parameters of the analytical representation may be one or more of:
- environmental scenario conditions,
- traffic scenario conditions.

In the system, the simulated reflected radar signature may be randomly selected based on specification of target parameters, list of scenarios and scenario conditions.

In the system, the simulated reflected radar signature may be a full continuous wave.

BRIEF DESCRIPTION OF THE DRAWINGS

FIGS. 4a-4c shows target scenarios considered for analytic target generation.

FIGS. 5a-5b illustrates paths of targets and their displacement with respect to a radar.

DETAILED DESCRIPTION

Figure 1:
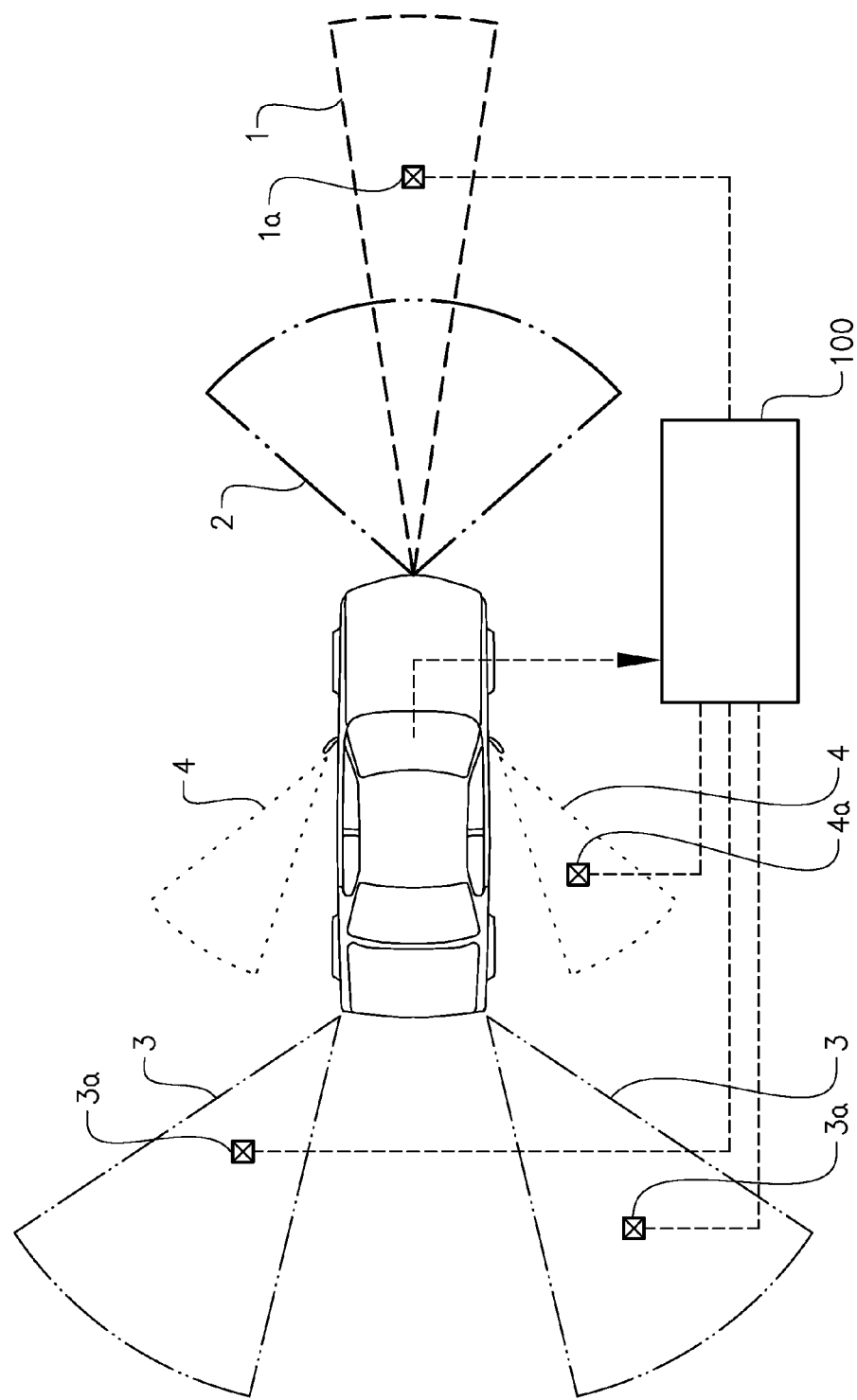
FIG. 1 shows a vehicle comprising different radars used in automotive safety applications.

FIG. 1 provides a view of the radar system in automotive safety application. FIG. 1 shows a vehicle comprising different radars used in automotive safety applications arranged in a hardware-in-the-loop set-up. The vehicle comprises two radars located in the front of the vehicle; a first radar 1 with a narrow beam, which for example is used to detect other road users moving at high speeds while adaptive cruise control (ACC) functionality is in use. A second radar 2 with a wider beam is arranged to detect for instance pedestrians or cyclists that appear in front of the vehicle to avoid collision. Rear radar sensors 3 at the back of vehicle alert if crossing traffic is moving in the areas behind the vehicle. Door mirror radars 4 are arranged to detect targets in the blind spots of the vehicle. The radars as well as an electronic control unit (ECU) are connected to a target simulator 100. Objects 1a, 3a and 4a correspond to virtual targets to be detected by each of the radars 1, 3 and 4. The feedback from each radar as well as any other feedback from the ECU is fed back to the target simulator. A more detailed description follows.

Figure 2:
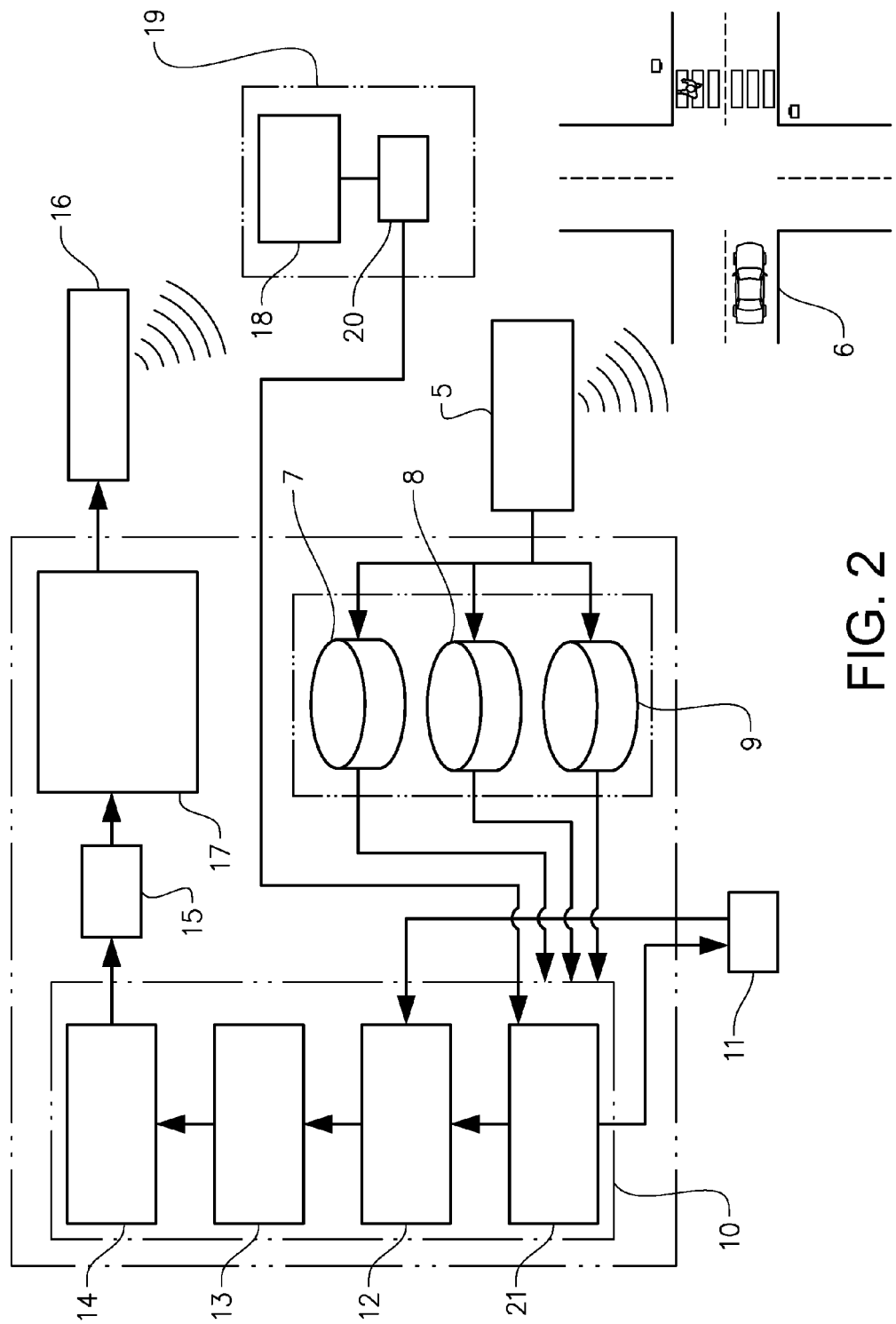
FIG. 2 is a schematic hardware block diagram for the hardware in the loop (HIL) setup.

A detailed description of the hardware setup is indicated in FIG. 2. In the first approach for target generation, the record-and-play approach or pre-recorded approach, the radar recorder system 5 captures a real target scenario 6. The measurements of the real target scenario form a real target database 7, a real clutter database 8, as well as a database for real scenario conditions 9. The data bases 7, 8, 9 are then used by the processing unit 10 to be used for generation of relevant virtual signals, i.e. a virtual target signature.

In the second approach, the analytical representation approach, a scenario for virtual target generation 12 is selected according to user commands from Graphic User Interface (GUI), 11. The virtual target scenario is applied to the analytic virtual target generation unit 13, where the signature of the desired virtual target is theoretically calculated and then generated in signal generation unit 14. The analogue signal from processing unit is converted to digital in a digital-to-analogue converter 15. It may be required to adjust the amplitude and range of the signature in order to make it suitable to be transmitted by the RF front end, 16. Signal amplification and conditioning circuit, 17, satisfies this need.

The vehicle under test 19 consists of a radar system, 18, which receives the generated simulated reflected radar signature corresponding to a virtual target and an electronic Computer Unit (ECU) 20, which performs data processing and forwards the result to evaluation module, 21. The evaluation module 21 measures the performance of the radar-based safety system and displays the results on the GUI 11. The radar system under test is, as a first estimate, expected to perform perfectly. Experience demonstrates that in reality it does not. By generating a controlled virtual environment, by knowing what output is expected from the radar system and by observing the reaction of the radar system or DUT, we can measure the actual performance of the whole system.

The following parameters are considered important with regard to generated simulated reflected radar signature from both pre-recorded real and analytical virtual scenarios in automotive safety area:
- Type of target, which includes pedestrians, cyclists, cars, trucks and other road users,
- environmental scenario conditions,
- traffic scenario conditions.
- Target velocity, distance, angle or trajectory of movement,
- Different weather conditions, affecting signal to noise ratio (SNR) in radar system,
- Radar Cross Section (RCS) of target, including the case of partial coverage of target by radar beam, and change in RCS over time.

Figure 3:
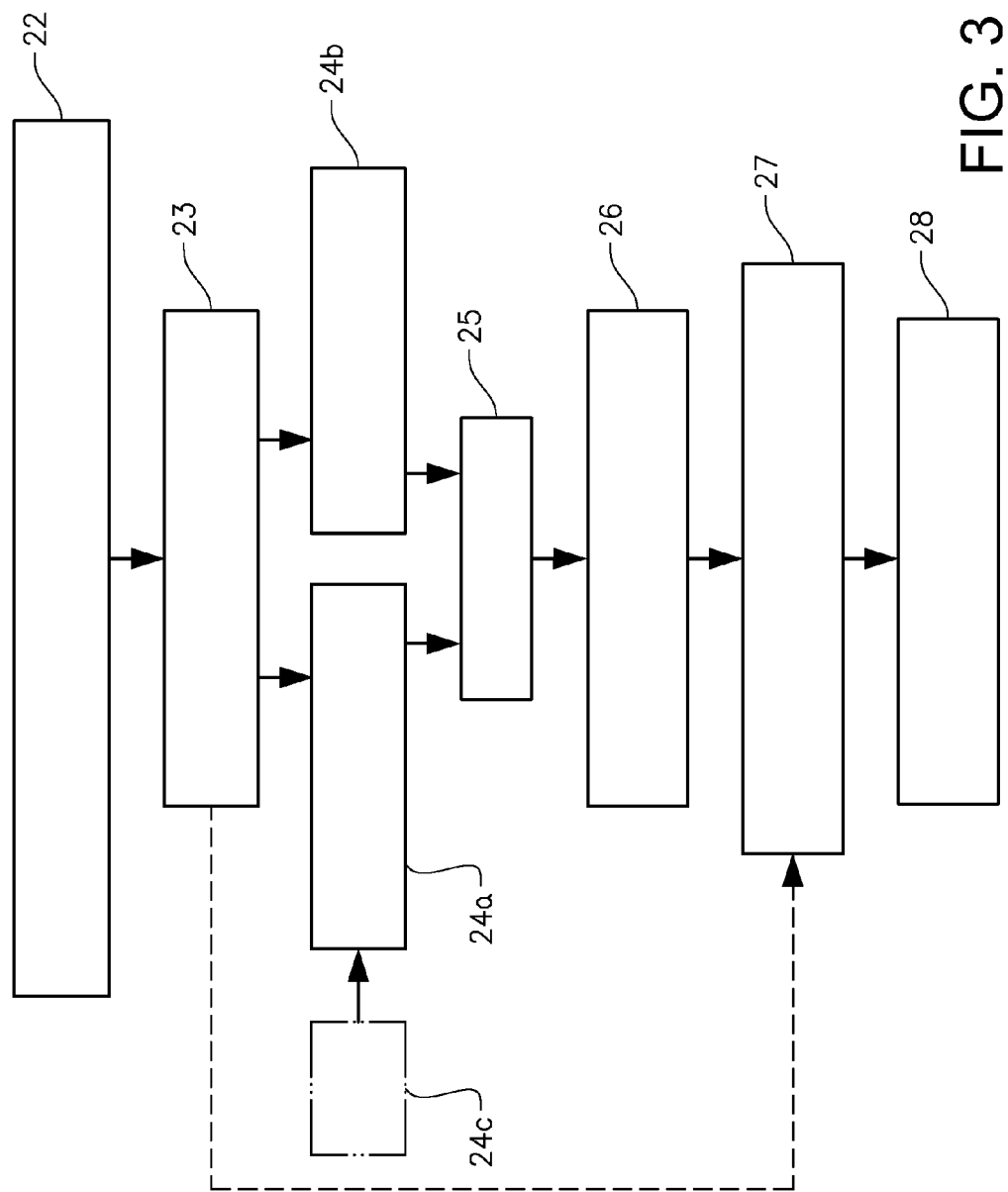
FIG. 3 schematically shows a flowchart of the target signature generation and HIL process.

FIG. 3 schematically shows a flowchart of the target signature generation and HIL process.

In the first block 22, a user will choose the general framework of the test scenario by specifying the parameters of the virtual target, the conditions of the virtual environmental scenario and the conditions of the virtual traffic scenario. In the second block, 23 the system randomly generates details of the scenario to be emulated based on the selected parameters and conditions. In block 24a or 24b, the system selects one or more virtual targets in a virtual scenario from the real scenarios taken from the database 24c of recorded real scenarios (block 24a) or from the analytical scenarios (block 24b). In block 25, a simulated reflected radar signature corresponding to at least one virtual target in a specific virtual scenario is generated and applied to the vehicle under test. In block 26, the simulated reflected radar signature is received by the radar system in the vehicle under test. In block 27, the results of the vehicles radar-based system reaction are evaluated by comparing the radar system output with the virtual target signature. In block 28, the performance is presented to the user. Performance can for instance be velocity/distance error, detection or no detection and false alarms.

FIGS. 4a-4c schematically illustrates target movement used in analytic target generation.

In analytic target generation, the primary scenario for target movement is the movement along a straight path in front of the radar. This is probably one of the most common cases in automotive application. FIG. 4a illustrates two pedestrians 29, 30 crossing a road 31 in front of vehicle 32. The first pedestrian 29 crosses the road 31 in a straight line perpendicular to the direction of the road 31. The second pedestrian 30 crosses the road 31 in a line, which is tilted at an angle relative to the direction of the road 31. The second radar 2 is used in order to detect the pedestrians 29, 30.

FIG. 4b illustrates two vehicles 32, 33 moving along a linear path, for instance along a lane of the road 31. In most moving traffic scenarios, vehicles move along a linear path, either towards or away from the front radar of a vehicle. The first radar 1 with a narrow beam is used to detect the second vehicle 33 moving at high speed. This scenario can for instance represent use of adaptive cruise control (ACC).

FIG. 4c illustrates detection of moving objects by a rear radar. This scenario can for instance represent a vehicle 32 backing out of a parking space 34. In FIG. 4c, a pedestrian 35 moves behind the vehicle 32. At the same time, a second vehicle 33 moves behind the first vehicle 32. Rear radars usually detect traffic moving along a straight line tilted with an angle relative to the direction of the radar beam due to the placement of the radars.

For generation of virtual targets in the cases described in conjunction with FIGS. 4a-4c, we need to calculate what the radar receives from the desired target. This is further elaborated on below.

FIGS. 5a and 5b illustrate various paths of a target and its displacement with respect to a radar 36.

In a simplified state of a Continuous Wave (CW) radar, the radar transmits a monotone signal s(t) with frequency $f_0$ in the form:

$$s(t)=\cos(2\pi f_0 t) \quad (1)$$

Also assuming different straight path movements for target at initial distance d, a moving target in each case causes a phase shift $\Delta\emptyset$ to the transmitted signal from the radar. Thus, the return signal r(t) from the target has the form of:

$$r(t)=\cos(2\pi f_0 t+\Delta\emptyset) \quad (2)$$

The phase shift, $\Delta\emptyset$, depends on the radial displacement from the radar, $\Delta d$, and is equal to:

$$\Delta\emptyset=2\pi\Delta d/\lambda \quad (3)$$

Here $\lambda$ is the radar signal wavelength, $\lambda=c/f_0$ and for targets in each case in FIGS. 4a-4c, the displacement in a radial direction can be calculated.

FIG. 5a illustrates vertical movement in front of the radar. The displacement $\Delta d$ is then calculated as $$\Delta d=\sqrt{d^2+x^2(t)}-d \quad (4)$$

where d is the initial distance from the radar and x(t) is the position of target at time t with reference to the initial point, as seen in FIG. 5a. When the target is moving with a constant acceleration a, or a constant speed v, then we have:

$$x(t) = \frac{1}{2}at^2 + vt \quad (5)$$

FIG. 5b illustrates a case of linear movement with a slope of $\beta$ in relation to the radar line of sight. The displacement $\Delta d$ is then calculated as $$\Delta d=\sqrt{(d+x(t)\cos\beta)^2+(x(t)\sin\beta)^2}-d \quad (6)$$

In the case of radial movement towards or away from radar, we have:

$$\Delta d=x(t)-d \quad (7)$$

It is assumed that the target has either constant velocity or constant acceleration over short periods of observation time.

After down conversion, the returned signals will be in the form of:

$$y(t)=\cos(\Delta\emptyset)=\cos(2\pi\Delta d/\lambda) \quad (8)$$

Generation of this signal for each movement pattern and playing them to the radar system in vehicle under test in FIG. 1 is equivalent to the observation of virtual targets in the corresponding situations by the radar.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Further useful applications where generation of relevant simulated reflected radar signature corresponding to at least one target in a specific scenario are conceivable within the scope of the invention. Accordingly, the drawings and the description are to be regarded as illustrative in nature, and not restrictive.

The invention claimed is:

1. A method for testing and evaluating a response of an automotive radar system for a specific automotive safety scenario, wherein the method comprises:
    arranging at least one automotive radar in a hardware in the loop setup,
    generating a simulated reflected radar signature corresponding to at least one virtual target in a specific virtual scenario,
    receiving the simulated signature by the at least one automotive radar,
    evaluating a response of the automotive radar system by comparing an output from the automotive radar system with an expected output based on the simulated target signature,
    displaying one or more of: error in velocity, error in distance, misdetection of the at least one target and false alarms,
wherein the generated simulated reflected radar signature corresponding to at least one virtual target in a specific virtual scenario is generated from one or more of:
    a pre-recorded real reflected radar signature from at least one real target in a specific real scenario,
    an analytical representation of a radar target signature from at least one target in a specific virtual scenario.

2. The method according to claim 1, wherein the specific virtual scenario comprises one or more of:
    at least one virtual target,
    clutter,
    virtual environmental scenario conditions
    virtual traffic scenario conditions.

3. The method according to claim 1, wherein the pre-recorded real reflected radar signature from a real target in a specific real scenario is generated by a processing unit by accessing pre-recorded real reflected radar signature databases.

4. The method according to claim 3, wherein the pre-recorded real reflected radar signature databases are created by recording real reflected radar signal with a radar recorder system, wherein the radar recorder system records real target data, real clutter data and real environmental scenario conditions and traffic scenario conditions and stores each data in a respective target data database, clutter data database and scenario conditions database.

5. The method according to claim 1, wherein the analytical representation is based on virtual target parameters of the virtual target in a specific virtual scenario, and on virtual scenario parameters of the specific virtual scenario.

6. The method according to claim 5, wherein the virtual target parameters are one or more of:
    type of target including pedestrians, cyclists, cars, trucks, animals, motorcycles, construction vehicles, road signs, road obstacles,
        target velocity, distance, angle or trajectory of movement,
    target radar cross section (RCS), including the case of partial coverage of target by radar beam, and change in RCS over time.

7. The method according to claim 5, wherein the virtual scenario parameters are one or more of:
    virtual environmental scenario conditions,
    virtual traffic scenario conditions.

8. The method according to claim 1, wherein the simulated reflected radar signature is randomly selected based on specification of virtual target parameters, list of virtual scenarios and virtual scenario conditions.

9. The method according to claim 1, wherein the simulated reflected radar signature comprises a full continuous wave.

10. A system for testing and evaluating a response of an automotive radar system for a specific automotive safety scenario, wherein the system comprises:
    at least one automotive radar in a hardware in the loop setup,
    an electronic computer unit connected to the at least one automotive radar,
    an evaluation module for evaluating the performance of the radar-based safety system,
    a graphical user interface,
    a radar front end arranged to generate a simulated reflected radar signature corresponding to at least one virtual target in a specific virtual scenario,
wherein the generated simulated reflected radar signature corresponding to at least one virtual target in a specific virtual scenario is generated from one or more of:
    a pre-recorded real reflected radar signature from at least one real target in a specific real scenario,
    an analytical representation of a radar target signature from at least one virtual target in a specific virtual scenario.

11. The system according to claim 10, wherein the specific virtual scenario comprises one or more of:
    at least one virtual target,
    clutter,
    virtual environmental scenario conditions
    virtual traffic scenario conditions.

12. The system according to claim 10, wherein the pre-recorded real reflected radar signature from a real target in a specific real scenario is generated by a processing unit by accessing pre-recorded real reflected radar signature databases.

13. The system according to claim 12, wherein the pre-recorded real reflected radar signature databases are created by recording real reflected radar signals with a radar recorder system, wherein the radar recorder system records real target data, real clutter data and real environmental scenario conditions and traffic scenario conditions and stores each data in a respective target data database, clutter data database and scenario conditions database.

14. The system according to claim 10, wherein the analytical representation is based on virtual target parameters of the virtual target in a specific virtual scenario, and on virtual scenario parameters of the specific virtual scenario.

15. The system according to claim 14, wherein target parameters are one or more of:
- type of target including pedestrians, cyclists, cars, trucks, animals, motorcycles, construction vehicles, road signs, road obstacles,
- target velocity, distance, angle or trajectory of movement,
- target radar cross section (RCS), including the case of partial coverage of target by radar beam, and change in RCS over time.

16. The system according to claim 14, wherein the virtual scenario parameters are one or more of:
- virtual environmental scenario conditions,
- virtual traffic scenario conditions.

17. The system according to claim 10, wherein the simulated reflected radar signature is randomly selected based on specification of virtual target parameters, list of virtual scenarios and virtual scenario conditions.

18. The system according to claim 10, wherein the simulated reflected radar signature comprises a full continuous wave.

* * * * *